US007000994B2

(12) United States Patent  
Leighton

(10) Patent No.: US 7,000,994 B2  
(45) Date of Patent: Feb. 21, 2006

(54) VEHICLE SEAT ASSEMBLY

(76) Inventor: Cassee Leighton, 87B Broadmeadow Rd., Apt. 5, Marlborough, MA (US) 01752

( * ) Notice: Subject to any disclaimer, the term of this patent is extended or adjusted under 35 U.S.C. 154(b) by 0 days.

(21) Appl. No.: 10/839,490

(22) Filed: May 5, 2004

(65) Prior Publication Data

US 2004/0222686 A1    Nov. 11, 2004

Related U.S. Application Data

(60) Provisional application No. 60/467,917, filed on May 5, 2003.

(51) Int. Cl.  
    *A47C 31/00*    (2006.01)
(52) U.S. Cl. .................... 297/484; 297/483; 297/475
(58) Field of Classification Search ............. 297/483, 297/484, 475, 254; 280/801  
See application file for complete search history.

(56) References Cited

U.S. PATENT DOCUMENTS

| | | | | |
|---|---|---|---|---|
| 4,738,413 A | * | 4/1988 | Spinosa et al. | 244/151 R |
| 5,123,673 A | * | 6/1992 | Tame | 280/801.1 |
| 5,135,285 A | * | 8/1992 | Dukatz et al. | 297/484 |
| 5,161,855 A |   | 11/1992 | Harmon | |
| 5,282,667 A | * | 2/1994 | Elton et al. | 297/238 |
| 5,503,461 A |   | 4/1996 | Schreier | |
| 5,653,504 A | * | 8/1997 | Henson | 297/238 |
| 5,704,684 A | * | 1/1998 | Dukatz et al. | 297/238 |
| 5,716,097 A | * | 2/1998 | Peck et al. | 297/238 |
| 6,655,744 B1 | * | 12/2003 | Petri et al. | 297/478 |

* cited by examiner

*Primary Examiner*—Peter M. Cuomo  
*Assistant Examiner*—Sarah B. McPartlin  
(74) *Attorney, Agent, or Firm*—Kriegsman & Kriegsman

(57) ABSTRACT

A vehicle seat assembly includes a vehicle seat, a first retractable restraint system for the vehicle seat and a second retractable restraint system for the vehicle seat. The first restraint system is in the form of a retractable, three-point shoulder harness. The second restraint system includes a first strap designed to resiliently retract onto a first take-up reel located within the back rest of the vehicle seat, a second strap designed to resiliently retract onto a second take-up reel located within the back rest of the vehicle seat, and a buckle assembly located within the seat support of the vehicle seat which is designed to lockably receive a tongue affixed onto each of the first and second straps. In operation, the first and second retractable restraint systems operate independently of one another and provide the vehicle seat with two separate means for safely restraining a passenger therein, the first restraint system being designed to restrain passengers in the vehicle seat who weigh over 100 pounds and the second restraint system being designed to restrain passengers in the vehicle seat who weigh between 40 and 100 pounds.

8 Claims, 4 Drawing Sheets

VEHICLE SEAT ASSEMBLY

CROSS-REFERENCE TO RELATED APPLICATIONS

The present application claims the benefit under 35 U.S.C. 119(e) of U.S. provisional Patent Application Ser. No. 60/467,917, filed May 5, 2003, the disclosure of which is incorporated herein by reference.

BACKGROUND OF THE INVENTION

The present invention relates generally to the automotive industry and more particularly to safety restraint systems for automotive vehicles.

Automotive vehicles (e.g., cars, trucks and buses) are provided with safety restraint systems (also commonly referred to simply as seat belts or safety belts) to restrain passengers within their seats. In this capacity, when a vehicle is subjected to a sudden movement (e.g., as the result of an accident), safety restraint systems serve to prevent each passenger from being jostled or thrown from the vehicle seat, thereby preventing each passenger from experiencing serious injuries.

As can be appreciated, safety restraint systems have been deemed essential devices in maintaining automotive safety. As a consequence, automotive industry standards mandate that safety restraint systems be provided in all automotive vehicles.

One type of safety restraint system which is commonly provided in automotive vehicles is a two-point lap belt. A two-point lap belt, which is often provided in the rear seats of an automobile, comprises a strap, or belt, which is designed to resiliently retract onto a take-up reel. The free end of the strap is provided with a metal tongue which is adapted to be selectively engaged by a buckle. It should be noted that the take-up reel and the buckle are fixedly secured to the opposite sides of the seat cushion of the vehicle seat for which it is provided. As such, with a passenger present on the seat and with the lap belt configured into its locked position, the belt extends laterally across the lap/waist of the passenger and is engaged by the buckle, with the buckle and the take-up reel providing the passenger with two separate points of restraint (i.e., a two-point restraint system).

Another type of safety restraint system which is commonly provided in automotive vehicles is a three-point shoulder harness. A three-point shoulder harness, which is often provided in the front seat of an automobile, comprises a strap, or belt, having a first end which is designed to resiliently retract onto a first take-up reel and a second end which is designed to resiliently retract onto a second take-up reel. A metal tongue is typically affixed onto the strap between its first and second ends, the tongue being adapted to be selectively engaged by a buckle. It should be noted that the first and second take-up reels are fixedly secured on the same side of the vehicle seat for which it is provided, the first take-up reel being located along the side of the seat cushion and the second take-up reel being located along the top of the back support. It should also be noted that the buckle is fixedly secured to the opposite side of the seat cushion from the first take-up reel. As such, with a passenger present on the seat and with the shoulder harness configured in its locked position, the belt extends laterally across the lap/waist of the passenger as well diagonally across the torso of the passenger until the tongue is engaged by the buckle, with the buckle and both take-up reels providing the passenger with three separate points of restraint (i.e., a three-point restraint system).

Although well-known and widely provided in automotive vehicles, lap belt and shoulder harness safety restraint systems of the type described above are designed only for use with larger passengers (i.e., passengers weighing over approximately 100 pounds).

For smaller passengers, such as infants and young children, there exist a wide variety of products which can be removably installed onto a vehicle and which function in conjunction with standard lap belt and shoulder harness safety restraint systems to restrain smaller passengers within an automobile.

Specifically, for an infant or young child weighing under 40 pounds, a car seat is typically employed to help restrain such a child within an automotive vehicle. A car seat is typically in the form of a reduced sized bucket seat which is provided with its own safety harness system to restrain the child therewithin. The car seat, in turn, is secured onto a seat in the vehicle using the standard lap belt or shoulder harness safety restraint which is provided for the vehicle seat on which the car seat is positioned.

For a young child weighing between 40 and 100 pounds, a booster seat is typically employed to help restrain such a child within an automotive vehicle. A booster seat is a small seat which is positioned on top of the seat cushion of a vehicle seat, thereby boosting the child up slightly from the seat cushion. The standard lap belt or shoulder harness safety restraint provided for the vehicle seat is used, in turn, to both secure the booster seat onto the vehicle seat and restrain the child onto the booster seat.

Although well known and widely used in commerce, booster seats suffer from a couple notable drawbacks.

As a first drawback, it has been found that booster seats often inadequately restrain a child secured thereby. Specifically, many conventional booster seats only provide a child passenger with two points of restraint. As can be appreciated, for a small child (i.e., a child weighing between 40 and 100 pounds), two points of restraint are often inadequate in preventing serious injury.

As a second drawback, it has been found that the installation and use of a booster seat is relatively cumbersome and time-consuming. In fact, due to the complexity involved in routinely installing a booster seat onto vehicle seat, it has been found that a booster seat is often improperly installed, thereby subjecting the child seated thereon to severe risk of injury. Furthermore, due to the large amount of time required to secure a booster seat onto a vehicle seat, certain guardians often bypasses the use of a booster seat entirely, opting instead to have the child to ride either without any harness system or with the vehicle provided harness system (which is improperly sized for the child), which is highly undesirable.

Accordingly, it is well known in the art for safety restraint systems specifically designed for a child (often referred to simply as child harness systems) to be integrated directly into a vehicle seat, thereby eliminating the need for a separate infant car seat or booster seat to be installed onto the vehicle seat.

For example, in U.S. Pat. No. 5,161,855 to M. L. Harmon, there is disclosed a vehicle seat with a built-in child safety seat that offers a five point restraint system directly anchored to the vehicle seat frame. Foldable headrests are provided which extend outwardly to form lateral headrests for a child carried by the child safety seat. The safety seat and headrests fold into the main vehicle seat back and are concealed when not in use.

Vehicle seats of the type described in detail above which are provided with an integrated child harness system typically suffer from a notable drawback. Specifically, the harness system integrated into the vehicle seat is not sized to adequately restrain an adult. As a result, an adult who attempts to sit on the seat while the automobile operates is required to: (1) ride without being secured by an adequate restraint system, (2) sit at an alternate site within the automobile (or, as is often the case, in another automobile entirely), or (3) perform a considerably complex, cumbersome and time-consuming conversion of the vehicle seat and its corresponding safety restraint system to accommodate a larger sized passenger.

SUMMARY OF THE INVENTION

It is an object of the present invention to provide a novel vehicle seat assembly.

It is another object of the present invention to provide a novel vehicle seat assembly which includes a vehicle seat and a safety restraint system for safely restraining a passenger within the vehicle seat.

It is yet another object of the present invention to provide a vehicle seat assembly as described above wherein the safety restraint system provides adequate protection in restraining either a child or an adult within the vehicle seat.

It is yet still another object of the present invention to provide a vehicle seat assembly as described above wherein the safety restraint system can be simply and quickly converted between a first configuration in which said system is designed to safely restrain a child within the vehicle seat and a second configuration in which said system is designed to safely restrain an adult within the vehicle seat.

It is even still another object of the present invention to provide a vehicle seat assembly as describe above which includes a limited number of parts, which is easy to use and which is inexpensive to manufacture.

Therefore, according to one feature of the present invention, there is provided a vehicle seat assembly comprising a vehicle seat, said vehicle seat comprising a seat support and a back rest, a first restraint system for said vehicle seat and a second restraint system for said vehicle seat, said second restraint system being at least partially retractable, said second restraint system operating independently of said first restraint system.

According to another feature of the present invention, there is provided a vehicle seat assembly comprising a vehicle seat comprising a seat support and a back rest, and a restraint system for said vehicle seat, said restraint system comprising, a first strap adapted to at least partially retract into the back rest of said vehicle seat, a second strap adapted to at least partially retract into the back rest of said vehicle seat and a buckle assembly adapted to be releasably coupled to said first and second straps.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
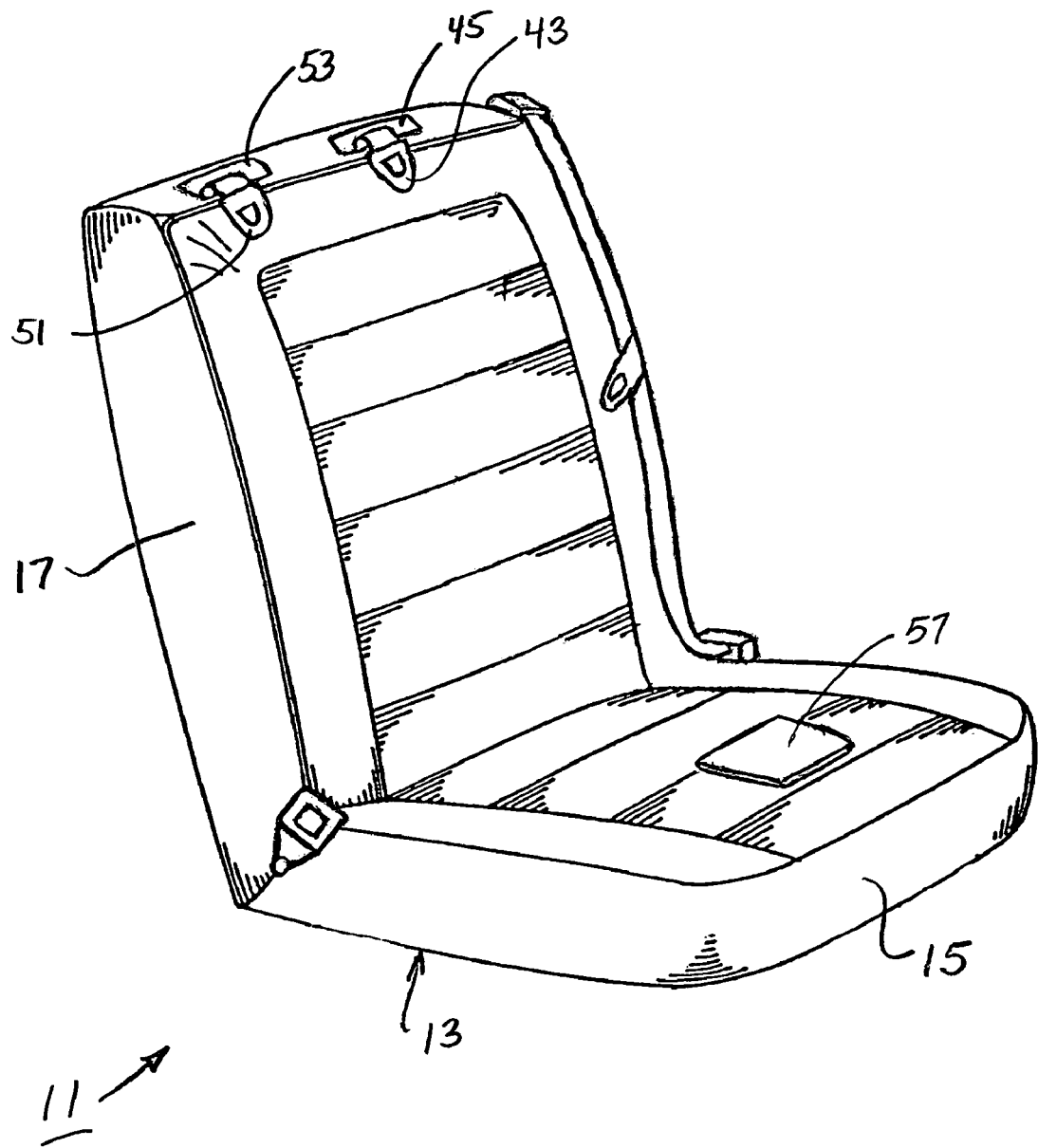
FIG. 1 is a front, perspective view of a vehicle seat assembly constructed according to the teachings of the present invention.

Referring now to the drawings, there is shown a vehicle seat assembly which is constructed according to the teachings of the present invention and identified generally by reference numeral 11. As will be described further below, vehicle seat assembly 11 is designed to safely accommodate both child and adult sized passengers, which is highly desirable.

As seen most clearly in FIG. 1, vehicle seat assembly 11 comprises a vehicle seat 13 which includes a horizontal seat support 15 and a vertical back rest 17 which are secured together in such a manner so as to provide vehicle seat 13 with a generally L-shaped configuration. Horizontal seat support 15 is represented herein as being in the form of a padded seat cushion which is preferably stuffed with a soft material (e.g., foam) to maximize passenger comfort. Similarly, vertical back rest 17 is represented herein as being in the form of a padded back support which is preferably stuffed with a soft material (e.g., foam) to maximize passenger comfort.

It should be noted that particular design details relating to the construction of vehicle seat 13 (e.g., the particular materials utilized in its manufacture) could be modified without departing from the spirit of the present invention. For example, vehicle seat 13 is represented herein as being in the form of a bucket seat. However, it is to be understood that vehicle seat 13 is not limited to a bucket seat design. Rather, it is to be understood that vehicle seat 13 could be modified to represent any type of seat which is utilized in a vehicle (e.g., a school bus, truck, plane, etc.) without departing from the spirit of the present invention.

As a principal feature of the present invention, vehicle seat assembly 11 is provided with a first safety restraint system 19 which is designed to retain an adult sized passenger in vehicle seat 13. In addition, vehicle seat assembly 11 is provided with a second safety restraint system 21 which is designed to retain a child sized passenger in vehicle seat 13. As will be described further below, first and second safety restraint systems 19 and 21 can be used individually or in combination in order to safely restrain either (1) a child weighing between 40 and 100 pounds or (2) a child or an adult weighing greater than 100 pounds.

Figure 2:
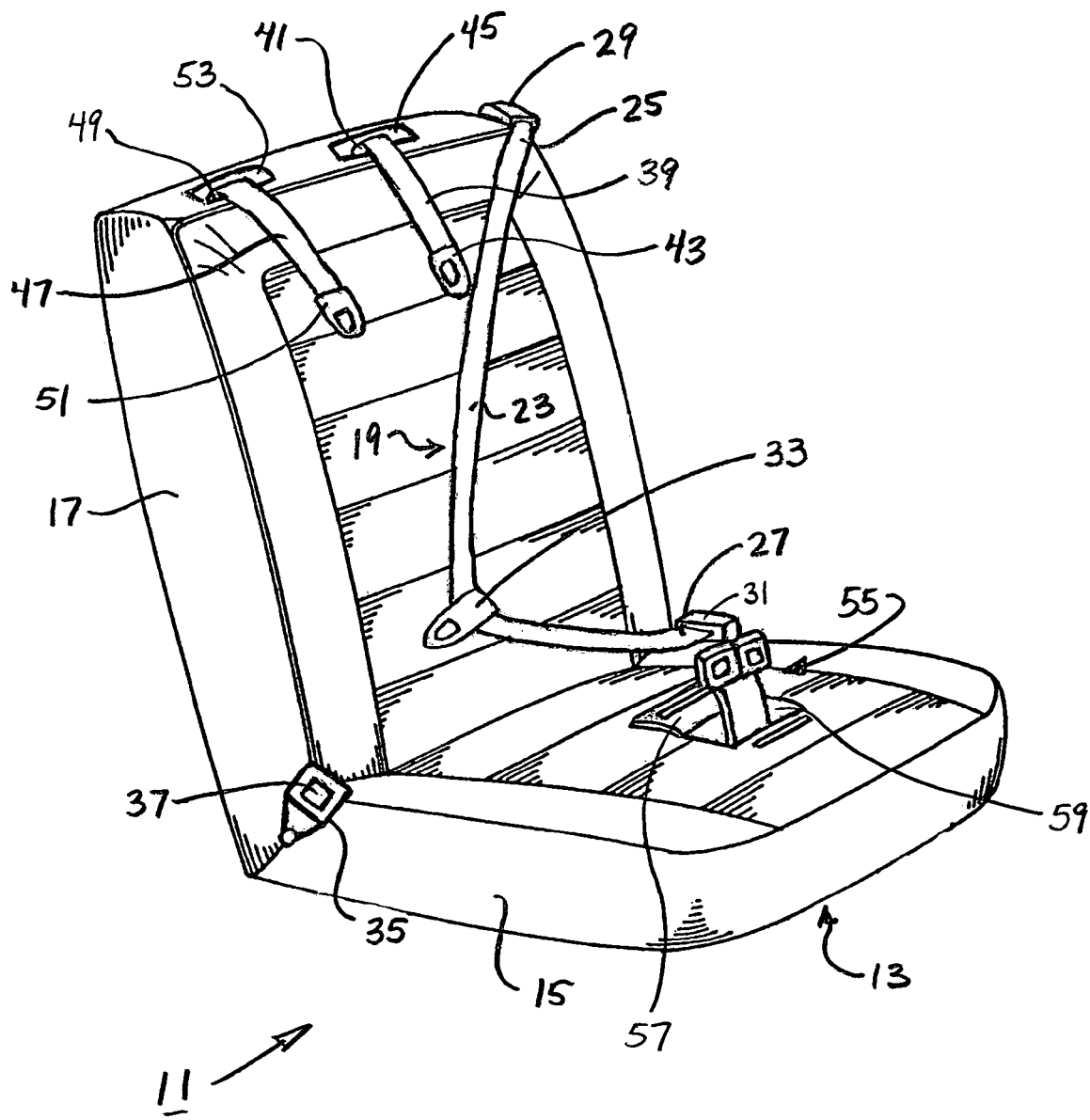
FIG. 2 is a front, perspective view of the vehicle seat assembly shown in FIG. 1, said vehicle seat assembly being shown with each of the first and second safety restraint systems disposed in a partially extracted and unlocked configuration.
Figure 3:
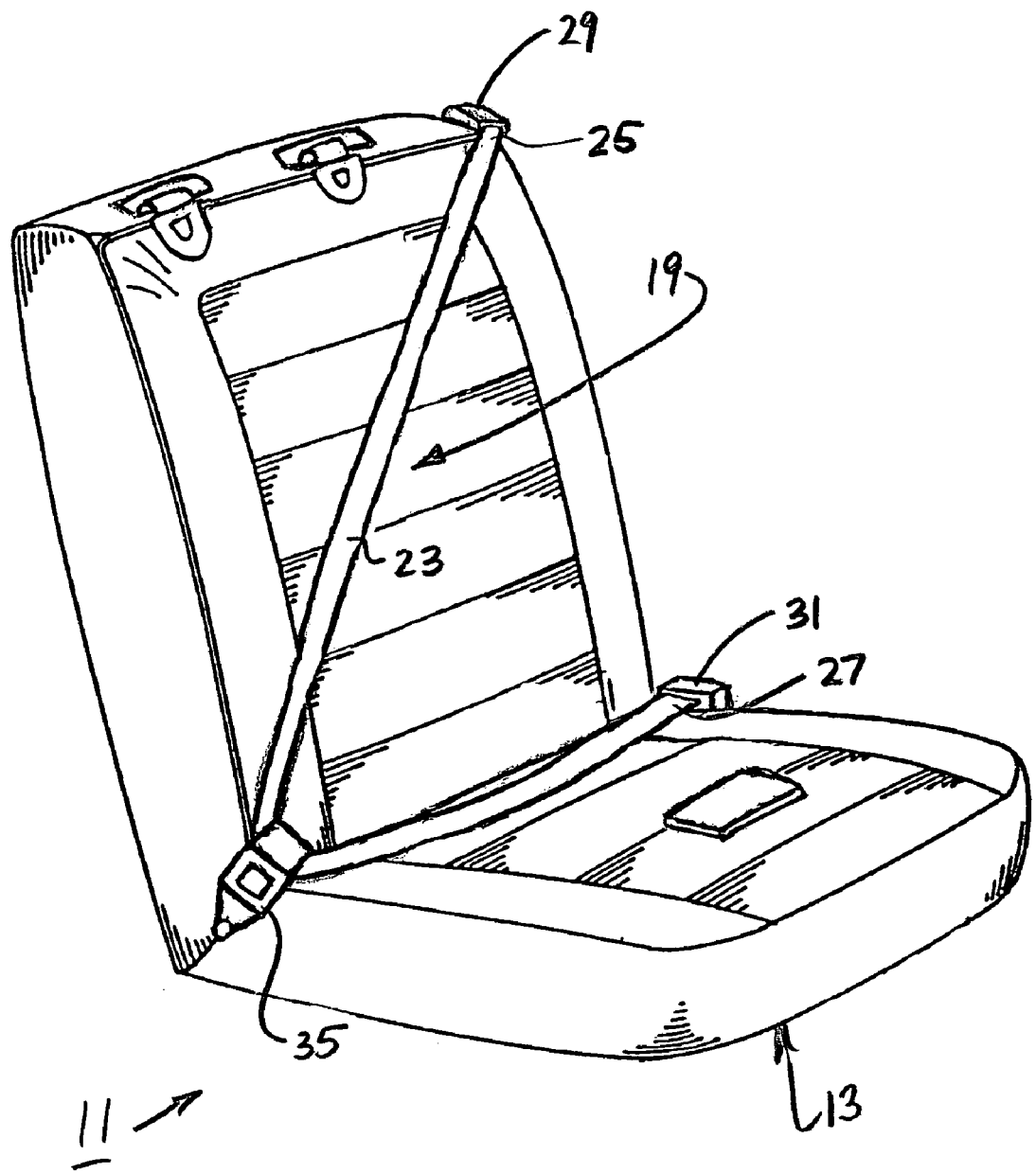
FIG. 3 is a front, perspective view of the vehicle seat assembly shown in FIG. 1, said vehicle seat assembly being shown with the first safety restraint system disposed in its locked position.

As seen most clearly in FIGS. 2 and 3, first safety restraint system 19 is coupled to vehicle seat 13 and is in the form of a three-point shoulder harness system which is conventional in construction. First safety restraint system 19 comprises a strap, or belt, 23 which includes a first end 25 and a second end 27. The portion of strap 23 proximate first end 25 is designed to resiliently retract, or collect, onto a take-up reel 29 which is preferably encased within a protective plastic housing. Similarly, the portion of strap 23 proximate second end 27 is designed to resiliently retract, or collect, onto a take-up reel 31 which is preferably encased within a protective plastic housing.

A tongue 33 constructed of a rigid and durable material, such as metal, is fixedly mounted onto strap 23 between first end 25 and second end 27. Tongue 33 is sized and shaped to be inserted into a complimentary buckle 35. As can be appreciated, insertion of tongue 33 into buckle 35 causes buckle 35 to matingly engage tongue 33, thereby locking tongue 33 in place within buckle 35. Tongue 33 is capable of release from buckle 35 through the depression of an externally accessible release button 37 which is provided on buckle 35.

It should be noted that first and second take-up reels 29 and 31 as well as buckle 35 are fixedly secured to either vehicle seat 13 or a nearby structure (e.g., an interior panel within the vehicle). First and second take-up reels 29 and 31 are located on the same side of seat 13, with first take-up reel 29 located on (or, in the alternative, proximate to) the top of back rest 17 and second take-up reel 31 located on (or, in the alternative, proximate to) the side of seat support 15. Buckle 35 is located on (or, in the alternative, proximate to) the side of seat support 15 which is opposite to take-up reel 31.

First restraint system 19 is designed to restrain a passenger weighing over 100 pounds to vehicle seat 13 in the following manner. Specifically, with the passenger seated on seat 13, strap 23 is extracted from take-up reels 29 and 31 so that tongue 33 can be inserted into and releasably engaged by buckle 35, as shown in FIG. 3. As such, with the passenger positioned on seat 13 and restraint system 19 configured in its locked position, strap 23 extends laterally across the lap/waist of the passenger as well as diagonally across the torso of the passenger. In this manner, strap 23 in combination with take-up reels 29 and 31 and buckle 35 provide the passenger with three separate points of restraint.

It should be noted that first safety restraint system 19 is not limited to being in the form of a shoulder harness having three points of restraint. Rather, it is to be understood that first safety restraint system 19 could be replaced with alternative types of conventional restraint systems, such as a two-point lap belt, without departing from the spirit of the present invention.

Figure 4:
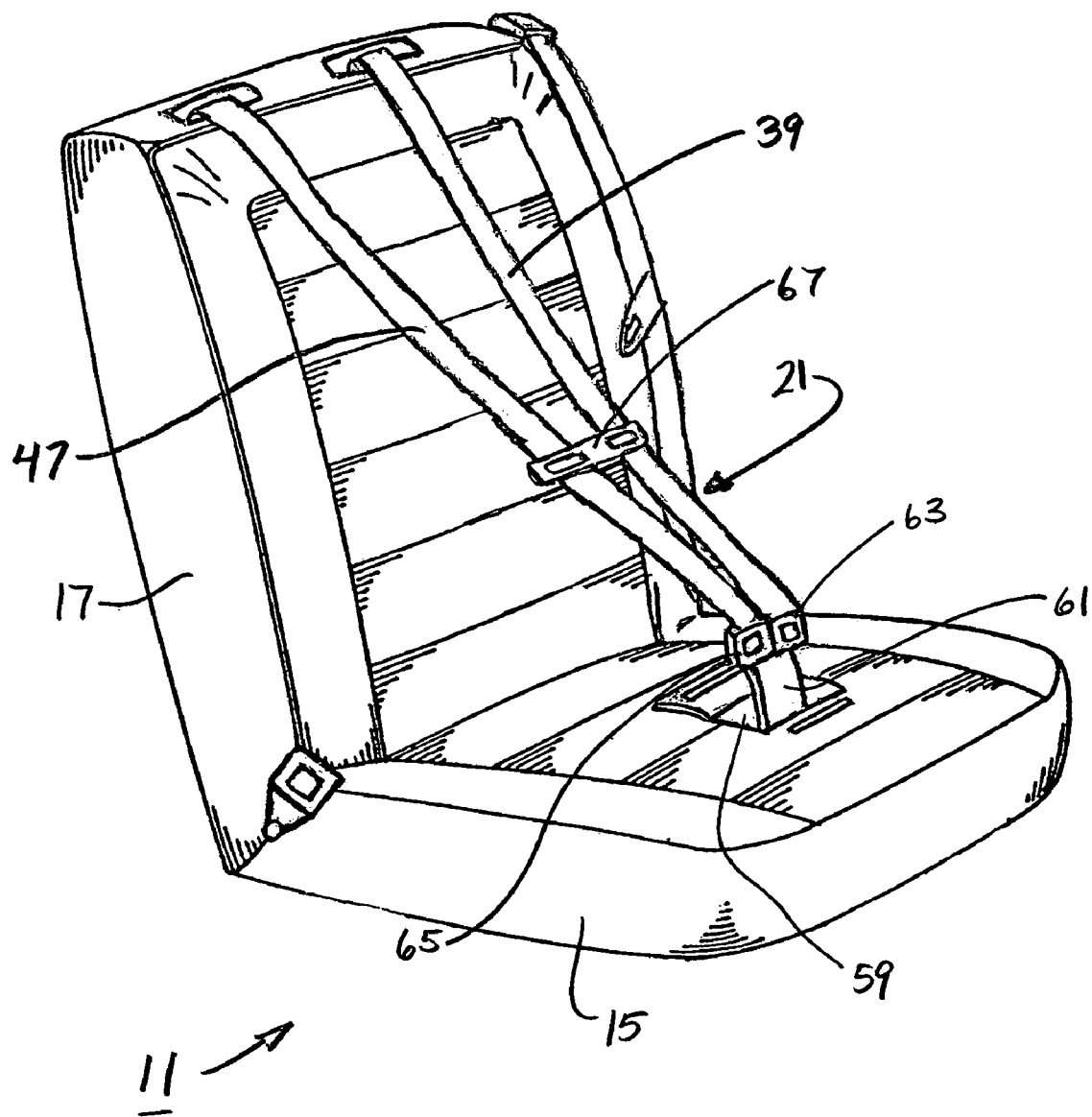
FIG. 4 is a front, perspective view of the vehicle seat assembly shown in FIG. 1, said vehicle seat assembly being shown with the second safety restraint system disposed in its locked position.

As seen most clearly in FIGS. 2 and 4, second safety restraint system 21 is integrated directly into seat 13. As will be described in detail herein, the particular construction of second restraint system 21 serves as the primary novel feature of the present invention.

Second safety restraint system 21 includes a first strap, or belt, 39. One end of strap 39 is designed to resiliently retract, or collect, onto a take-up reel 41 which is located within (i.e., inside) back rest 17. A tongue 43 constructed of a rigid and durable material, such as metal, is mounted onto the free end of first strap 39. Preferably, strap 39 is configured such that, in the absence of any outside force thereon, take-up reel 41 retracts strap 39 such that tongue 43 barely (e.g., partially) protrudes out through a corresponding fitted slot 45 formed in the top surface of back rest 17, as shown in FIG. 1.

Second safety restraint system 21 similarly includes a second strap, or belt, 47. One end of strap 47 is designed to resiliently retract, or collect, onto a take-up reel 49 which is located within (i.e., inside) back rest 17 in a spaced apart relationship from take-up reel 41. A tongue 51 constructed of a rigid and durable material, such as metal, is mounted onto the free end of second strap 47. Preferably, strap 47 is configured such that, in the absence of any outside force thereon, take-up reel 49 retracts strap 47 such that tongue 51 barely (e.g., partially) protrudes out through a corresponding fitted slot 53 formed in the top surface of back rest 17, as shown in FIG. 1.

Second safety restraint system 21 additionally comprises a buckle assembly 55 which is located within (i.e., inside) seat support 15 and which is externally accessible by means of a pivotal flap 57 integrated into seat support 15. Flap 57 is capable of being pivoted between a closed position, as shown in FIGS. 1 and 3, and an open position, as shown in FIGS. 2 and 4.

With flap 57 disposed in its closed position, as shown in FIGS. 1 and 3, a passenger is free to utilize first safety restraint system 19 without having buckle assembly 55 detract from the passenger's comfort. Preferably, complimentary fasteners such as hook and pile type fasteners (commonly referred to as VELCRO® in the art) are secured (e.g., using an adhesive) onto the interior surface of flap 57 and the outer surface of seat support 15 to retain flap 57 in its closed position.

With flap 57 disposed in its open position, as shown in FIGS. 2 and 4, buckle assembly 55 is free to protrude out through a small rectangular opening 59 formed in seat support 15. Buckle assembly 55 comprises a relatively rigid strap 61 which projects out through opening 59 and orthogonally up from the top surface seat support 15. In addition, a pair of adjacent buckles 63 and 65 are fixedly mounted onto the free end of strap 61 in a side-by-side relationship, buckle 63 being adapted to receive and engage tongue 43 on strap 39 and buckle 65 being adapted to receive and engage tongue 51 on strap 47.

Second safety restraint system 21 is specifically designed to restrain a passenger weighing between approximately 40 and 100 pounds to vehicle seat 13 in the following manner. Specifically, with the passenger seated on seat 13, flap 57 is disposed into its open position, thereby enabling buckle assembly 55 to be withdrawn from seat support 15 through opening 59. Tongues 43 and 51 are then extracted out from back rest 17 and are inserted into and releasably engaged by buckles 63 and 65, respectively, as shown in FIG. 4. As such, with the passenger positioned on vehicle seat 13 and with safety restraint system 21 configured in its locked position, straps 39 and 47 extend vertically down over the shoulders of the passenger in a spaced apart manner and are coupled to buckle assembly 55 which projects up between the legs of the passenger. A clip 67, which is shown in FIG. 4, is preferably included to draw straps 39 and 47 closely towards one another. Configured as such, second safety restraint system 21 provides the passenger with three points of restraint.

As noted above, vehicle seat assembly 10 is provided with first and second fully retractable safety restraint systems 19 and 21 which operate independently of one another, each safety restraint system being designed to protect a different class of passengers. To the contrary, conventional vehicle seats are provided with only a single safety restraint system which is designed for use with a relatively narrow range of passengers (i.e., passengers weighing over 100 pounds). In fact, conventional vehicle seats require the cumbersome installation of an outside device (e.g., a booster seat) in order to safely accommodate the relatively large class of passengers which safety restraint system 21 is specifically designed to protect (i.e., passengers weighing between 40 and 100 pounds). As a result, it should be appreciated that vehicle seat assembly 10 is readily able to safely accommodate a broader range of passengers than conventional vehicle seats, thereby promoting greater passenger safety, which is highly desirable.

Particular design features of second safety restraint system 21 provides vehicle seat assembly 10 with a number of notable advantages, as will be described in detail herein.

As a first design feature, second safety restraint system 21 is integrated directly into seat 11 and is designed to accommodate passengers weighing between 40 and 100 pounds. As a result, vehicle seat assembly 10 does not require the routine installation of a conventional booster-type seat for each passenger weighing between 40 and 100 pounds (as is currently required in conventional vehicles), which is highly desirable.

As a second design feature, second safety restraint system 21 provides a passenger with dual-shoulder, three-point restraint. As can be appreciated, a dual-shoulder, three-point restraint system is highly effective in retaining a young child weighing between 40 and 100 pounds within his/her seat, which is highly desirable. To the contrary, the conventional use of a booster seat and a lap belt only provides a passenger with cross-lap, two-point restraint, which has been found to be particularly insufficient during certain vehicle accidents.

As a third design feature, second safety restraint system 21 is a fully retractable system. Specifically, first and second straps 39 and 47 are designed to resiliently retract within back rest 17. Similarly, buckle assembly 55 is adapted to be stored entirely within seat support 15 and covered by flap 57 when not in use. As a result, a passenger weighing less than 100 pounds, such as a young child, can freely use second safety restraint system 21 without being impeded by first safety restraint system 19. In addition, a passenger weighing more than 100 pounds, such as an adult, can freely use first safety restraint system 19 without being impeded by second safety restraint system 21, which is highly desirable. In this manner, vehicle seat assembly 11 is provided with two fully-retractable and independently operable restraint systems, one of which is designed for use with a child and the other of which is designed for use with an adult, which is a principal object of the present invention.

It should be noted that, if first safety restraint system 19 were in the form of a two-point lap belt harness system, first and second harness systems 19 and 21 could be utilized together at the same time to provide a passenger with five separate points of restraint, which is highly desirable.

The embodiment shown of the present invention is intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. A vehicle seat assembly comprising:
   (a) a vehicle seat, said vehicle seat comprising a seat support and a back rest,
   (b) a first restraint system for said vehicle seat, and
   (c) a second restraint system for said vehicle seat, said second restraint system being coupled to said vehicle seat and at least partially retractable, said second restraint system operating independently of said first restraint system, said second restraint system comprising,
      (i) a first belt designed to fully retract onto a first take-up reel that is located within the back rest of the vehicle seat, the first belt having a free end,
      (ii) a second belt designed to fully retract onto a second take-up reel that is located within the back rest of said vehicle seat, the second belt having a free end,
      (iii) first and second tongues, the first tongue being mounted onto the free end of the first belt and the second tongue being mounted onto the free end of the second belt, and
      (iv) a buckle assembly adapted to releasably receive the first and second tongues, wherein the buckle assembly can be configured between a first position in which said buckle assembly is disposed entirely within the seat support of the vehicle seat and a second position in which the buckle assembly at least partially projects out from the seat support of the vehicle seat.

2. The vehicle seat assembly of claim 1 wherein said buckle assembly is accessible through a pivotal flap which is integrated into the seat support of said vehicle seat.

3. The vehicle seat assembly of claim 2 wherein said buckle assembly comprises:
   (a) a strap adapted to selectively project out from the seat support of said vehicle seat,
   (b) a first buckle affixed to said strap, said first buckle being adapted to receive the first tongue, and
   (c) a second buckle affixed to said strap, said second buckle being adapted to receive the second tongue.

4. The vehicle seat as claimed in claim 1 wherein the first take-up reel resiliently retracts the first belt in the absence of any outside force thereon to the extent that the first tongue protrudes partially out through a corresponding slot formed in the back rest of the vehicle seat.

5. The vehicle seat as claimed in claim 4 wherein the second take-up reel resiliently retracts the second belt in the absence of any outside force thereon to the extent that the second tongue protrudes partially out through a corresponding slot formed in the back rest of the vehicle seat.

6. A vehicle seat assembly comprising:
   (a) a vehicle seat comprising a seat support and a back rest, and
   (b) a restraint system for said vehicle seat, said restraint system comprising,
      (i) a first strap designed to resiliently retract onto a first take-up reel, the first take-up reel being located within the back rest of said vehicle seat, the first strap having a free end,
      (ii) a second strap designed to resiliently retract onto a second take-up reel, the second take-up reel being located within the back rest of said vehicle seat, the second strap having a free end,
      (iii) first and second tongues, the first tongue being mounted on the free end of said first strap, the second tongue being mounted on the free end of said second strap, and
      (iv) a buckle assembly adapted to be releasably receive each of said first and second tongues, wherein said buckle assembly can be configured between a first position in which said buckle assembly is disposed entirely within the seat support of said vehicle seat and a second position in which said buckle assembly at least partially projects out from the seat support of said vehicle seat.

7. The vehicle seat as claimed in claim 6 wherein the first take-up reel resiliently retracts the first strap in the absence of any outside force thereon to the extent that the first tongue protrudes partially out through a corresponding slot formed in the back rest of the vehicle seat.

8. The vehicle seat as claimed in claim 7 wherein the second take-up reel resiliently retracts the second strap in the absence of any outside force thereon to the extent that the second tongue protrudes partially out through a corresponding slot formed in the back rest of the vehicle seat.

* * * * *